Jan. 3, 1933.   F. A. COOK   1,892,932

SHIM

Filed July 7, 1928

INVENTOR.
Fred A. Cook,
By Walter N. Haskell,
his Attorney.

Patented Jan. 3, 1933

1,892,932

UNITED STATES PATENT OFFICE

FRED A. COOK, OF ROCK ISLAND, ILLINOIS

SHIM

Application filed July 7, 1928. Serial No. 290,928.

My invention has reference to a shim, such as are commonly inserted between the axle of an automobile and the springs thereof to compensate for a faulty position of the axle, as by having a rearward tilt or "caster". In placing the shim in position the automobile parts are loosened up to receive the shim and again tightened when the device is in place. It frequently happens that the parts become loose through vibration, and on account of the wedge shape of the shims they are liable to work out and be lost. The chief purpose of the present invention is to provide the shim with a locking means, precluding the necessity of bending its ends or using auxiliary means for holding it in place.

Another purpose thereof is to provide a shim that can be positioned between a spring and axle without removing or blocking up any of the parts.

Figure 1:
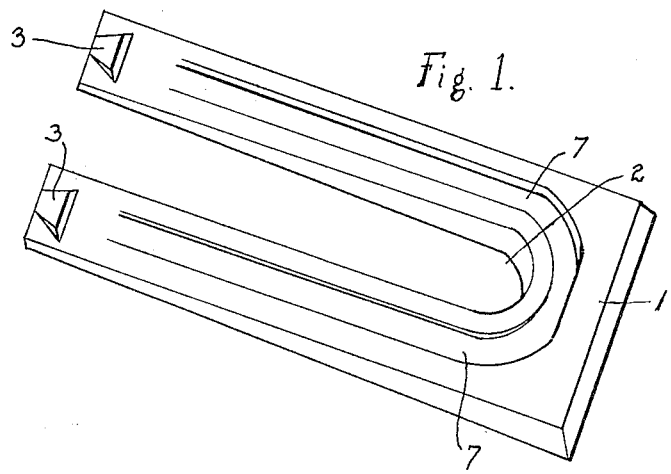
Fig. 1 is a perspective view of the shim in inverse position.
Figure 2:
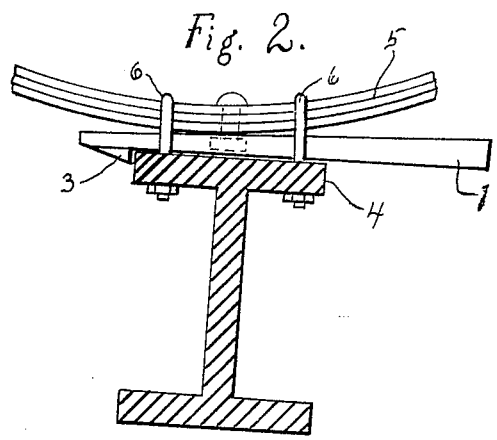
Fig. 2 is a fragmentary view of an axle and spring, showing the shim in use therewith.

The reference number 1 indicates a wedge-shaped plate, provided with a central opening 2 to allow for the bolt by which the leaves of the spring are united. The ends of the plate 1 are provided with wedge-shaped lugs 3, which can be readily driven between the axle 4 and spring 5, when the U-bolts 6 are loosened, said lugs being turned downwardly as shown in Fig. 2. The lugs then interfere with any movement of the plate outwardly in the direction of the large end thereof.

The plate 1 is preferably formed on each side with a U-shaped groove 7, the relatively thick edges of the plate giving sufficient strength thereto for the purpose for which it is used.

The device is simple and effective, and can be produced at a minimum of cost.

What I claim as my invention, and desire to secure by Letters Patent, is:

1. A device of the class described, comprising a wedge-shaped centrally channeled plate and a self-acting catch on the small end thereof.

2. A device of the class described, comprising a wedge-shaped plate having a central opening extending to the thinner end of said plate, and wedge-shaped lugs on the small ends of the plate.

3. In combination with the axle of an automobile and spring mounted thereon, a bolt passing through said spring, and a wedge-shaped plate between said axle and spring, provided with a recess extending into one of its ends to accommodate said bolt, said bolt, spring and axle cooperating to hold the plate in place, said plate having at its thin end, upon opposite sides of said recess, wedge-shaped lugs having their thick portions directed the same way as the thick portion of the plate to assist the spring and axle in holding the plate in place, and the shape of the forward end of the plate making it easy to force same into the space between the spring and axle.

In testimony whereof I affix my signature.

FRED A. COOK.